Figure 1:
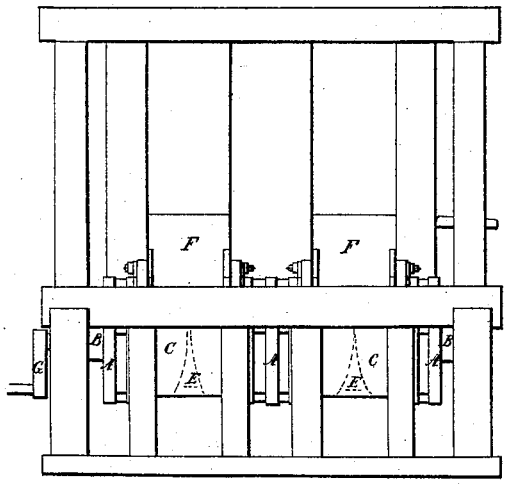
Figure 4:
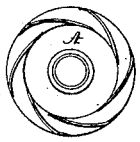
Figure 2:
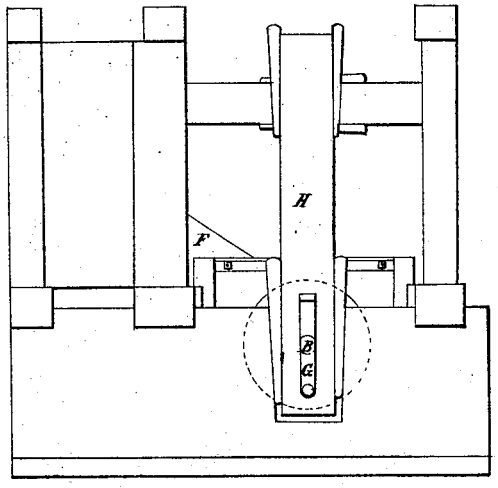
Figure 3:
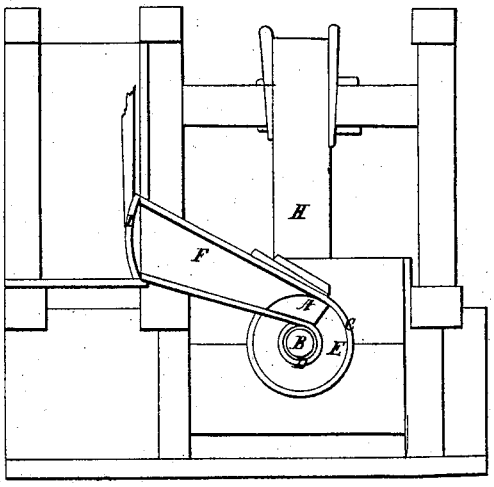

No Printed Specification Available

5684x

Z. & A. Parker,

Water Wheel,

Patented Oct. 19. 1829.

N. PETERS, PHOTO-LITHOGRAPHER, WASHINGTON, D. C.

MISSING PAGE TEMPORARY NOTICE

PATENT # 5684X FOR ISSUE DATE 10-19-1829

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text